(12) United States Patent
McGlashan-Powell et al.

(10) Patent No.: US 6,816,637 B2
(45) Date of Patent: Nov. 9, 2004

(54) MAGNETO-OPTICAL SWITCHING BACKPLANE FOR PROCESSOR INTERCONNECTION

(75) Inventors: Maurice McGlashan-Powell, Mt. Vernon, NY (US); Philip Charles Danby Hobbs, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 10/073,450

(22) Filed: Feb. 11, 2002

(65) Prior Publication Data

US 2003/0152305 A1 Aug. 14, 2003

(51) Int. Cl.[7] .............................. G02B 6/27; G02B 6/35; G02B 6/126
(52) U.S. Cl. .............................. 385/11; 385/14; 385/16; 385/6
(58) Field of Search .............................. 385/4, 6, 11, 14, 385/16, 24, 27–28, 31, 36, 39, 40

(56) References Cited

U.S. PATENT DOCUMENTS

| | | | | |
|---|---|---|---|---|
| 3,990,776 A | * | 11/1976 | Tseng et al. ................. | 385/6 |
| 4,859,013 A | * | 8/1989 | Schmitt et al. ............... | 385/6 |
| 4,898,440 A | | 2/1990 | Tamada et al. .............. | 385/130 |
| 5,408,565 A | | 4/1995 | Levy et al. .................. | 385/130 |
| 5,726,788 A | * | 3/1998 | Fee et al. .................... | 398/180 |
| 5,982,539 A | * | 11/1999 | Shirasaki .................... | 385/11 |
| 6,120,917 A | | 9/2000 | Eda ............................ | 428/692 |
| 2002/0131171 A1 | * | 9/2002 | Hung ......................... | 359/484 |

* cited by examiner

*Primary Examiner*—Hemang Sanghavi
*Assistant Examiner*—Omar Rojas
(74) *Attorney, Agent, or Firm*—George Sai-Halasz; Robert M. Trepp

(57) ABSTRACT

A system and method are disclosed for an optical backplane in an electronic processor that comprises of a plurality of processing units. The backplane is comprising of a network of optical waveguides which can guide polarized light. Furthermore, the backplane has magneto optic routers for steering light at the vertexes of the network, and the backplane also has optical devices for operationally connecting the processing units to the network. The backplane network affords an optical interconnection amongst all of the processing units.

27 Claims, 7 Drawing Sheets

MAGNETO-OPTICAL SWITCHING BACKPLANE FOR PROCESSOR INTERCONNECTION

FIELD OF THE INVENTION

This invention relates to a system, and a method, for using an optical backplane to provide ultra high frequency optical interconnections amongst microprocessors. The backplane is comprised of an optical waveguide network and magneto-optical routers.

BACKGROUND OF THE INVENTION

Th speed of computing devices, such as electronic processors, has been steadily increasing. Processing speed is accompanied by a need for rapid communication amongst processing units. The communication bandwidth requirements of microprocessors (the words processing unit and microprocessor will be used interchangeably) are roughly proportional with speed, and chip cycle times are reaching into the GHz domain. The central computing complexes of large computers comprise of many individual microprocessors, packaged into multi chip modules (MCM), combining their individual performance in a fashion that is transparent to end user. This is only possible if the individual microprocessor chips communicate with each other at sufficiently high bandwidth. Another arena where processor unit to processor unit communication is of concern is the massively parallel computing approach. In such computers hundreds, or thousands, of individual processors, each possibly comprising of several microprocessors, have to be all interconnected at high speeds. A major packaging challenge of computing systems always has been the communication infrastructure, the so called wiring backplane of sufficient bandwidth. The way this is presently done is to have sufficient number of metal wiring in the backplane, connecting the processors to one another. However, as data rates increase metal interconnects between chips, or between multi chip modules, are reaching their limits. Communication between processor chips is starting to be a performance bottleneck. Metal interconnects suffer from loss, cross talk, excessive power requirements, all limiting the maximum achievable bandwidth. As a result of such difficulties optical interconnections are now being seriously considered to take the place of metal wiring.

Optical interconnects have the distinct advantage of almost limitless bandwidth, no cross talk, and low loss. However, the actualization of a purely optical backplane hitherto faced formidable obstacles. There are problems with the integration of lasers, detectors, and waveguides into necessarily small spaces afforded in microprocessor technology. There is also the problem of how to direct light pulses along an optical network at GHz speeds. Then, there is the problem of process integration, namely the difficulty of the processing technology needed to incorporate lasers, detectors, and waveguides into a CMOS technology framework.

SUMMARY OF THE INVENTION

The object of this invention is an optical backplane and methods of its use in an electronic processing system. Such a processing system comprises of a large number of microprocessors, with the backplane providing connections amongst the processing units. The processing system can be a single processor in a multi chip embodiment, in which case the processing units are individual chips, or the processing system itself can be a multi processor, in which case the individual processing units again can be chips, or can alternatively be MCMs. Or, one can have combinations of these, depending on the particulars of a system, as one skilled in the art would observe.

It is a further object of the invention to use thin film technology for creating the optical backplane, such a technology being similar and compatible to that used in CMOS technology, whereby such an optical backplane can be integrated with CMOS technology.

It is yet a further object of the invention to provide for routers in such an optical network. These routers are based on magneto-optical polarization rotator and polarization beam splitter combinations.

It is yet a further object of the invention to provide for the whole optical interconnection network, based on planar, ridge, or cylindrical waveguides. Such waveguide types are well known in the appropriate arts. Also, for providing apparatus and method for controlling the routers in such an optical network. The routers allow establishing of communication amongst processing units at a speed commensurate with the bandwidth requirements. Communication amongst processing units can mean interconnecting any two unit, or to allow for a broadcasting mode, where one processing unit simultaneously transfers data to more than one other unit, or possibly to all of the other units.

The light in the network originates when electrical signals from each microprocessor drive an array of lasers, preferably Vertical Cavity Surface Emitting Lasers (VCSEL'S). Laser light is polarized, and when such light is steered into the waveguide network through the optical devices that operationally connect the processing units to the network, it enters the waveguides in a polarized state. The operation of the optical routers is based on the fact the light in the network is polarized. There are several ways, based on polarization beam splitters, to direct light into differing optical paths depending on the polarization angle of the light. If such a polarization beam splitter is preceded by an optical element which is capable to controllably set the polarization angle, one has achieved an optical router which is part of an optical waveguide network. In the preferred embodiment such an optical element, which controllably sets the polarization angle, is a magneto optic rotator (MOR). In a MOR the waveguiding layer has magnetic properties, and depending on its magnetization state it rotates the polarization angle of the guided light. In a preferred embodiment such a magneto-optically active layer comprises of Yttrium Iron Garnet (YIG).

When the polarized light passes through a YIG waveguide segment, the polarization of the incident light can be converted from TE to TM mode (horizontal to vertical polarization), or vice versa, depending on the magnetization within the YIG. In a preferred embodiment this mode conversion is done in two steps, using two sections of YIG material. In the first step the incident polarization is rotated by +45° or −45°. A second section of YIG waveguide has its magnetization permanently aligned parallel to the direction of light propagation and gives a constant +45° of rotation to the incident light, which has already been rotated by +45° or −45°. This then gives a final angle of rotation of 90° or 0°, depending on the choice made in controlling the magnetic field in the first section. One skilled in the art will observe that the operation of the routing scheme is not in need of polarization rotation angles which are exactly of the desired values. There is some latitude of having the polarization rotations accomplished to within a few percent of the exact desired values.

BRIEF DESCRIPTION OF THE DRAWINGS

These and other features of the present invention will become apparent from the accompanying detailed description and drawings.

DETAILED DESCRIPTION OF THE INVENTION

Figure 1:
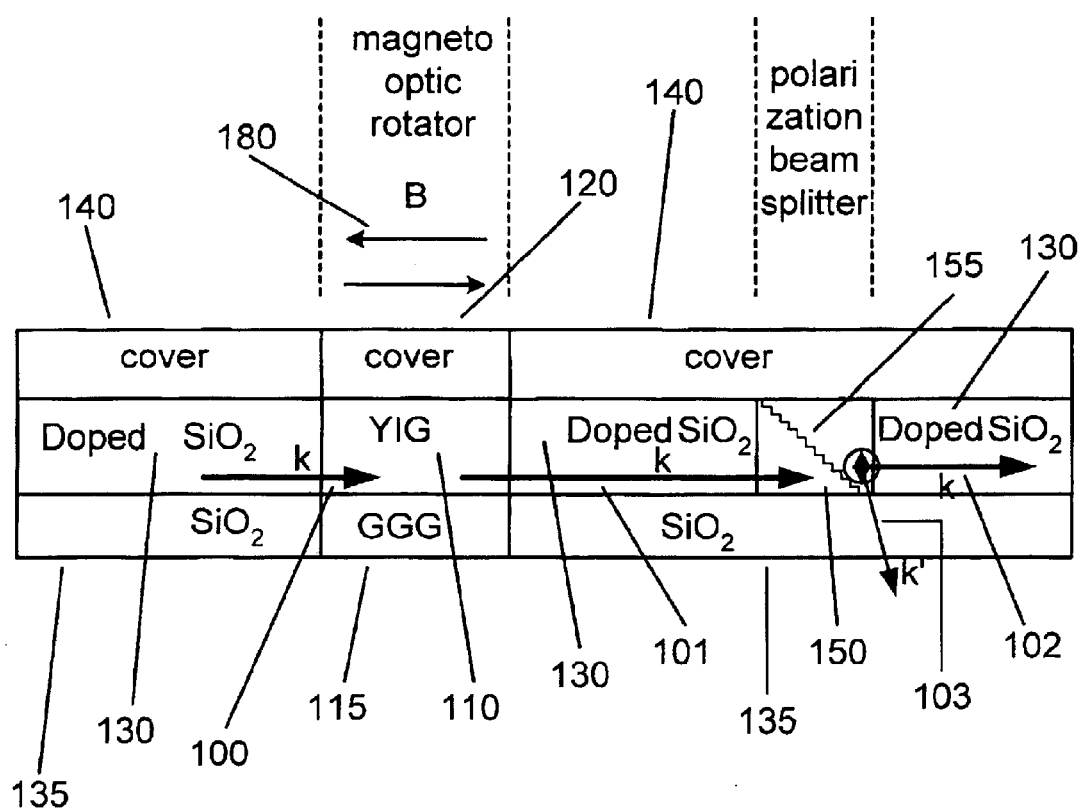
FIG. 1. Shows elements of a router for polarized light.

FIG. 1 shows elements of a router for polarized light. The router comprise of two parts, a magneto optic rotator (MOR) followed by a polarization beam splitter (PBS). In one embodiment these two parts of the router are seamlessly integrated into an optical waveguide. FIG. 1 shows a sandwich structure for both the router and for the shown pieces of the waveguide network. The waveguide network of the optical backplane is based on a $SiO_2$, or alternatively a polymer, waveguide structure. In one embodiment an undoped $SiO_2$ optical layer 135 of an index of refraction (ns) is interfacing with a doped $SiO_2$ layer 130. Due to the doping, the doped $SiO_2$ has an index of refraction, (nf) approximately equal to 1.45. The waveguide typically needs a doped $SiO_2$ which interfaces, that is, it is deposited on the top, or below, of an undoped $SiO_2$. The requirement of this undoped $SiO_2$ layer is for it to have a lower refractive index than the doped $SiO_2$ layer. In the embodiment of a sandwich structure, the doped $SiO_2$ layer 130 being disposed between the undoped $SiO_2$ layer 135 and a third optical layer, or cover layer 140, which has a refractive index (nc). The doped $SiO_2$ layer 130 is guiding the polarized light because the refraction indexes are such that nc<nf>ns. The cover layer 140 in a preferred embodiment is another layer of undoped $SiO_2$, but it can be made by many other optical materials as long as nc<nf. The cover layer 140 can be omitted, with air (or vacuum) taking up the appropriate optical role.

The MOR is also shown in a sandwich structure embodiment. A magneto-optically active layer 110, in a preferred embodiment a YIG layer, being disposed between a gadolinium gallium garnet (GGG) layer 115 and a cover layer 120. The cover layer 120 in a preferred embodiment is another layer of GGG, but it can be made by many other optical materials as long as it has a refractive index below that of YIG. The cover layer 120 can be omitted, with air (or vacuum) taking up the appropriate optical role. The MOR has a magneto-optically active layer which interfaces, that is, it is deposited on the top, or below, of an additional optical layer. The requirement of this additional optical layer is for it to have a lower refractive index than the magneto-optically active layer. The cover layer 120 is a third optical layer making up the sandwich structure together with the magneto-optically active layer 110 and the additional optical layer 115. In case of a sandwich structure the two layers between which the magneto-optically active layer is being disposed are two other optical layers. In order for the light be guided in the magneto-optically active layer, the these two other optical layers have lower refractive indexes than the magneto-optically active layer. The polarized light is guided in the YIG layer 110, which receives the light k 100, from the doped $SiO_2$ layer 130, and transmits the light k 101 back to the doped $SiO_2$ layer 130. The index k being a light propagation wave vector indicating propagation and wavelength.

The YIG layer 110 can be grown by liquid phase epitaxy (LPE) or epitaxial sputter deposition on GGG layers. The index of refraction of GGG layer 115 is approximately 1.94, while that of the YIG layer approximately 2.18.

An external variable magnetic field 180 is applied to the MOR. The external magnetic field 180 lines up the magnetization of the YIG layer 110, and according to the direction of this lineup and the strength of the field the polarization angle of the light 100, is either rotated by approximately 90°, or it is left approximately intact. Accordingly light 101 might have the opposite (horizontal vs vertical, or vice versa), polarization compared to light 100. Light 101 next arrives to a PBS 150. The shown PBS is of the variety which is constructed into the optical waveguide network. The light guided by layer 130 strikes the PBS 150 which in FIG. 1 is a vertical polarization grating 155 etched into the waveguide network. The etching would be perpendicular into the doped $SiO_2$ waveguide and then would be filled with a conducting material such as copper. A polarization grating, such as 155, and its operation is known in the art. (See for instance, Wang and Shablisky, J. Vac. Science and Technology, Vol 17B, No. 6, p2957.)

The grating 155 transmits the light 101 continuing in the straight direction k 102, if light 101 had one (horizontal or vertical) polarization angle, or deflects it into a side branch of the optical network in direction k' 103, if light 101 had the perpendicular polarization angle (vertical or horizontal). The polarization angle of light 101 was determined by magnetic field 180, thus by controlling field 180 one can choose the path that the light takes in the network.

Figure 2:
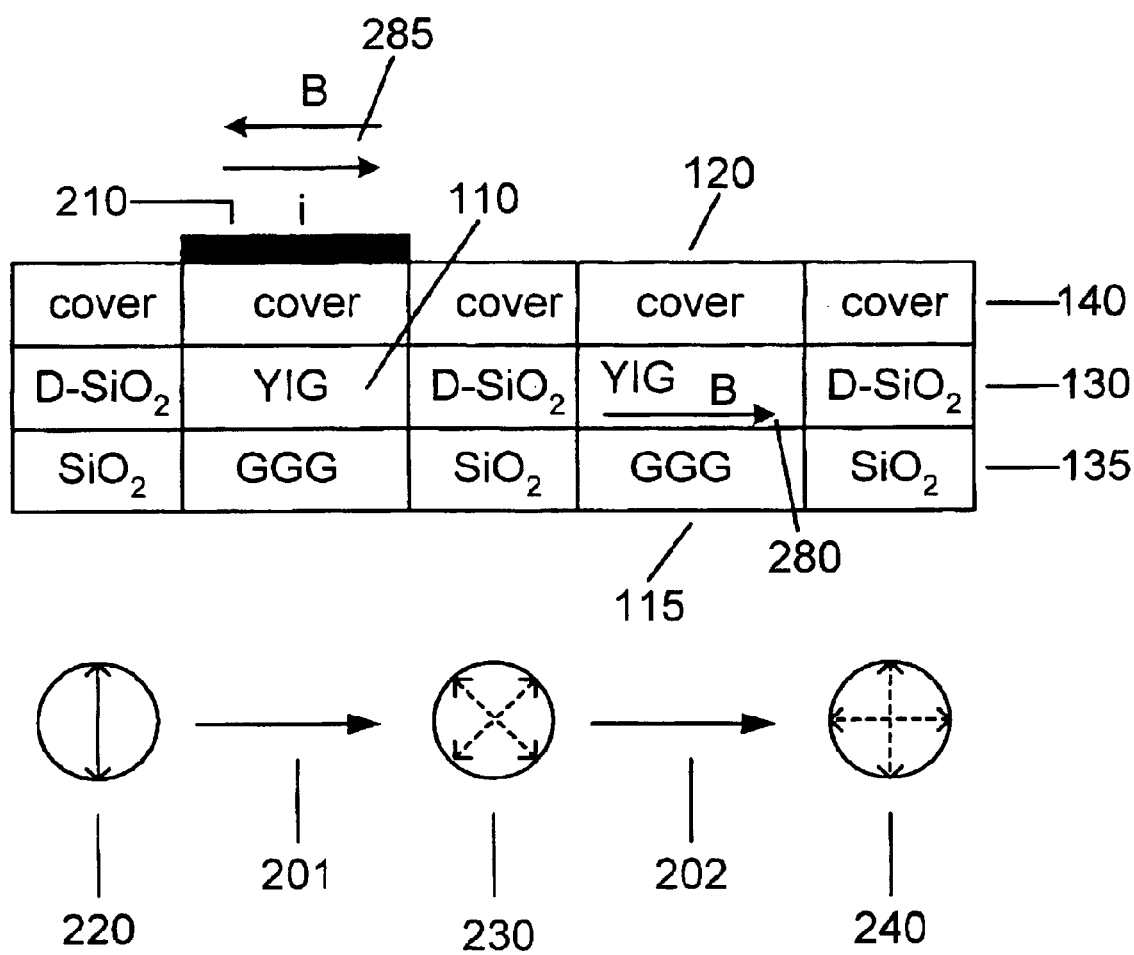
FIG. 2. Shows two section of a magneto optic rotator as part of an optical network.

FIG. 2, shows two section of a MOR as part of an optical network, a preferred embodiment. In a first section, where the light enters first, the magnetization of the YIG layer 110 is determined by a variable magnetic field B 285. The field is created by a current "i" flowing in a metallic strip 210, where the metallic strip substantially covers this first section of the MOR. Substantially covering this first section of the MOR means such a positioning that the magnetic field generated by the current flowing in the stip controls the magnetization of the magneto-optically active layer. Typically a magnetic field of 1 gauss is needed in order to switch the magnetization in the YIG, such a field can be generated with a current of less than 125 mA, allowing switching of magnetization at multi GHz frequencies. In this first section the magnetic field B 285 is selectively switched between two modes. In these two modes the magnetic field is equal in magnitude but opposite in direction. The result is that the polarization angle depending on the choice of the direction of the current will be rotated by either +45° or −45°. This is illustrated at the bottom part of FIG. 2. Suppose the light arrives with a vertical polarization 220. After passing through the first section 201, it will be in a + or −45° polarization state 230. In the second section 202 there is no external magnetic field applied, rather a permanent magnetization prevails 280 in the YIG. This second section 202 is at a sufficient distance from the first section 201, or it is shielded by other methods, that the variable magnetic field 285 of section 201 does not perturb the permanent magnetization of section 202. Upon the light passing through the second MOR section the polarization angle is always rotated by +45°. The net result is that upon leaving the MOR, having crossed both sections, the polarization angle of the light, depending on the outside choice of selecting the right current in strip 210, either stayed in the original vertical state, or it has been turned by 90°, 240.

FIG. 3. schematically shows routers for polarized light with various embodiments of polarization beam splitters. The figure roughly depicts the waveguides from a top view.

Figure 3A:
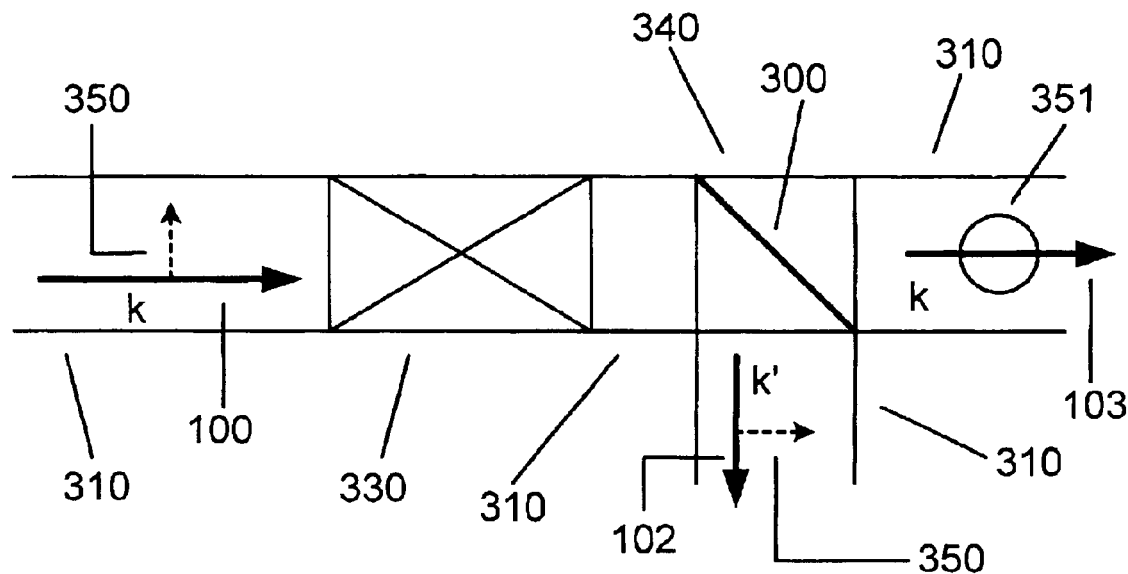
FIG. 3. Schematically shows routers for polarized light with various embodiments of polarization beam splitters.

In FIG. 3A a Brewster angle PBS 300 is shown. Such a Brewster angle beam splitter can be fabricated by etching a trench at Brewster's angle into the doped region of the $SiO_2$ waveguide 340. This surface is then coated with Magnesium Fluoride (MgF) stacks of ¼ wavelength thickness to enhance the polarization selectivity. The MgF layers can be deposited by physical vapor deposition. The rest of the trench can be filled with a low index, ~1, material or air.

In the shown case light 100 with a certain polarization 350 is traveling in the waveguide network 310. In the 330 MOR the polarization angle may be rotated to the opposite state (horizontal vs vertical, or vice versa). Upon arriving to the splitter region 340, with the Brewster angle splitter 300, the light is transmitted 103 if its polarization state has been changed 351, or it is deflected 102 if its polarization state remained the same 350. One can adjust the position of the Brewster angle beam splitter to transmit or deflect with opposite polarization than just described. The result in any case is that depending on a polarization rotation which occurred in the MOR 330, the light is controllably routed.

Figure 3B:
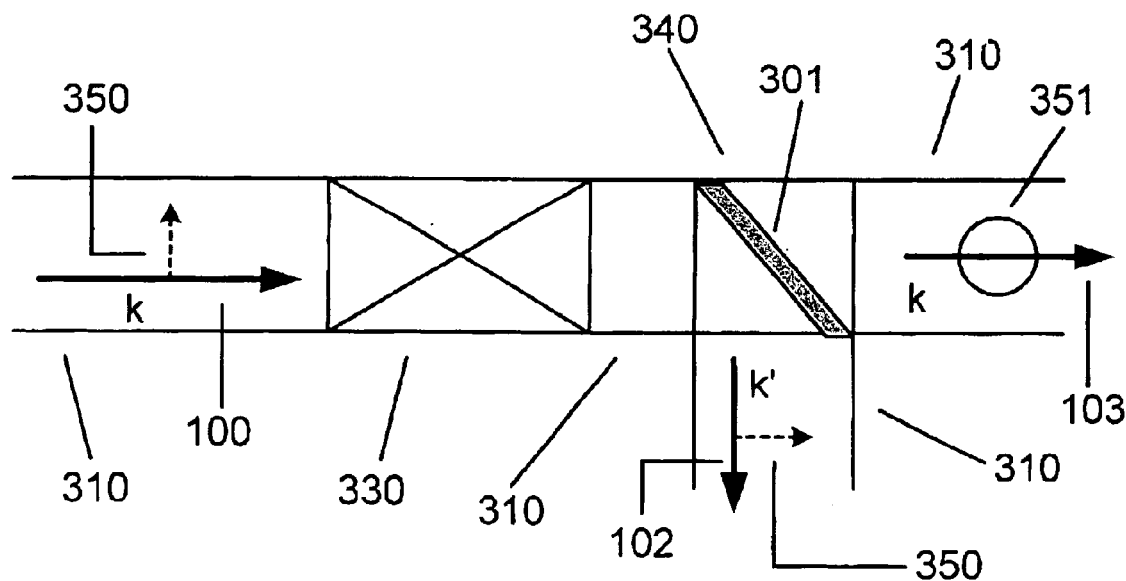

In FIG. 3B a birefringent prism 301 built into the waveguide network is shown. Such a birefringent material prism can be quartz or calcite built into the doped $SiO_2$. This thin film Glan-Thompson type polarizer can be fabricated by depositing doped $SiO_2$ on a quartz substrate, epitaxialy recrystallize this amorphous $SiO_2$ layer with Cs ion irradiation and annealing. (See for instance: F. Roccaforte and S. Dhar, Appl. Phys. Lett. Vol. 75, No 19. p 2903, 1999.) This thin film of doped crystallographically oriented quartz can then be patterned into the Glan-Thompson type polarizer, and mated to the rest of the waveguide structure 340.

In the shown case light 100 with a certain polarization 350 is traveling in the waveguide network 310. In the 330 MOR the polarization angle may be rotated to the opposite state. Upon arriving to the splitter region 340, with the birefringent prism 301, the light is transmitted 103 if its polarization state has been changed 351, or it is deflected 102 if its polarization state remained the same 350. The birefringent prism 301 can be built into the waveguide to transmit, or deflect, with the opposite polarization than was just described. The result in any case is that depending on a polarization rotation which occurred in the MOR 330, the light is controllably routed.

Figure 3C:
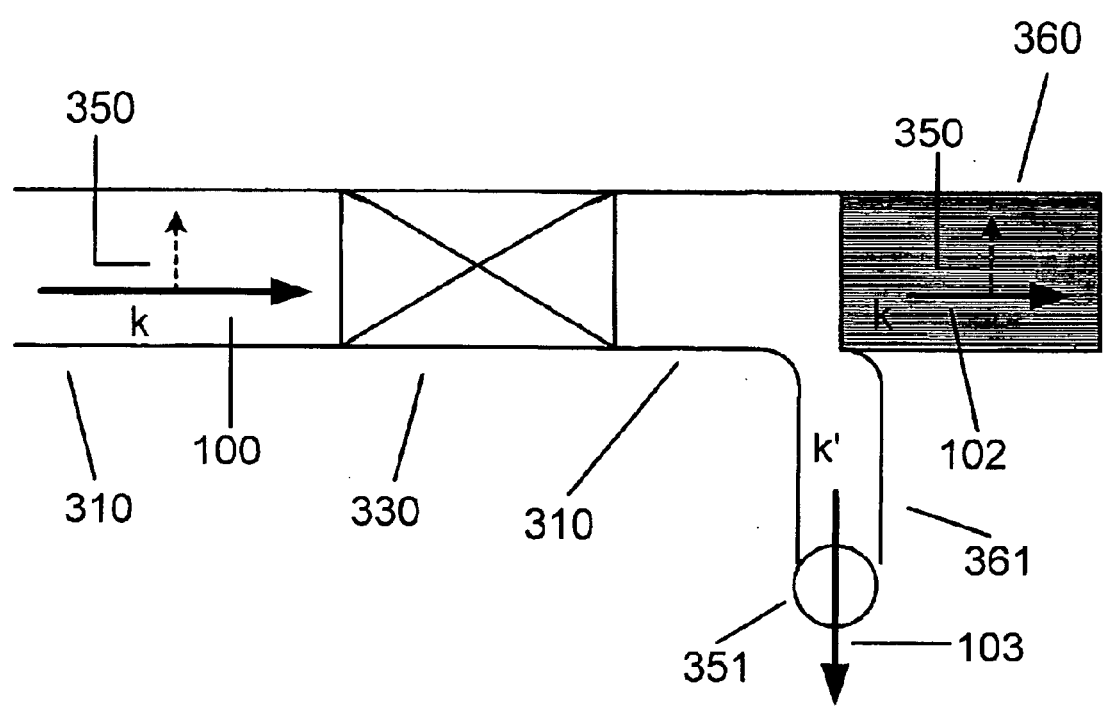

The Brewster mirror splitter 300, the birefringent prism 301, and the polarization grating splitter 155, shown in FIG. 1, are PBS embodiments of optical elements constructed into the optical waveguide network. FIG. 3C show a PBS embodiment which functions based on a waveguiding property.

In FIG. 3C the PBS is having asymmetric waveguide output arms 360 and 361. Each of the waveguide output arm is capable of propagating light only with one predetermined polarization angle. This is done by fabricating the output of the directional coupler with one arm 360 designed such that it vertical dimension (thickness) is small enough to be below the cut off condition for the vertical mode, and thus only guides the horizontal 350 mode. Similarly, the other arm 361 is designed such the horizontal dimension cannot support the horizontal mode and only supports the vertical mode 351. Light 100 with a horizontal polarization 350 is traveling in the waveguide network 310. In the 330 MOR the polarization angle may be rotated to the opposite state (horizontal vs vertical, or vice versa). Upon arriving to the splitter region, in the shown case the light is transmitted 102 if its polarization state is still horizontal 350, or it is deflected 103 if its polarization state has been rotated 351. One can of course change the directions of the two arms. The result in any case is that depending on a polarization rotation which occurred in the MOR 330, the light is controllably routed. These waveguide output arms have an appropriate length to accomplish their purpose of propagating only one type of polarization. Past this appropriate length they are fabricated to revert back to the normal shape of the waveguides.

Figure 4A:
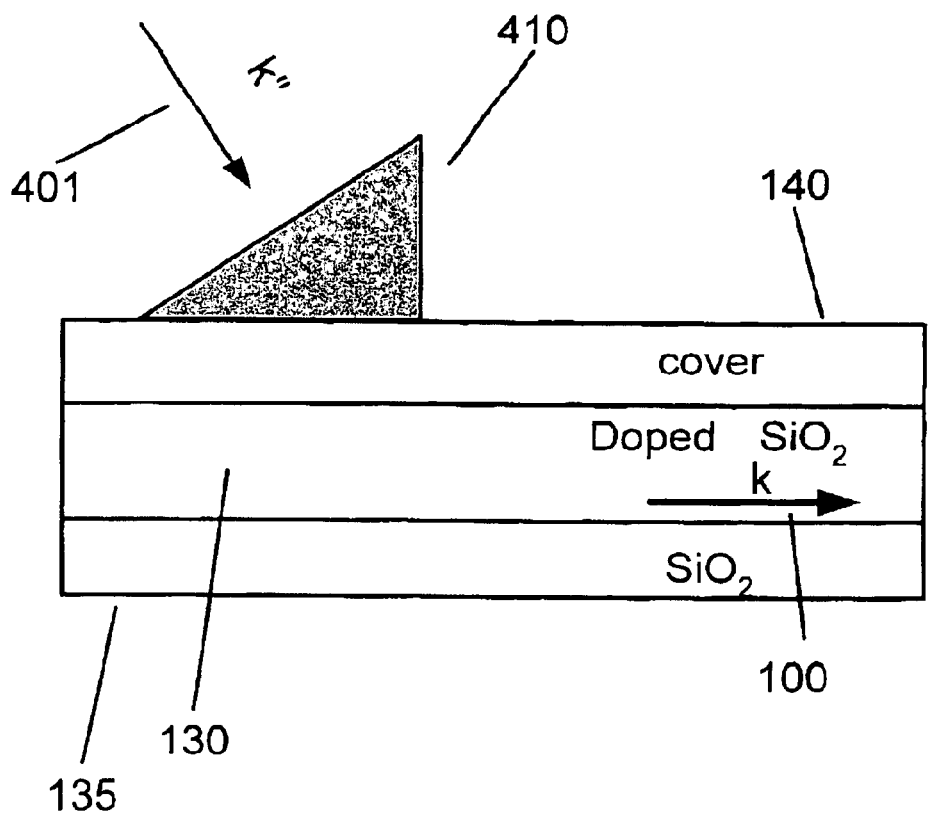
FIG. 4. Schematically shows optical devices for operationally connecting processing units to the waveguide network.
Figure 4B:
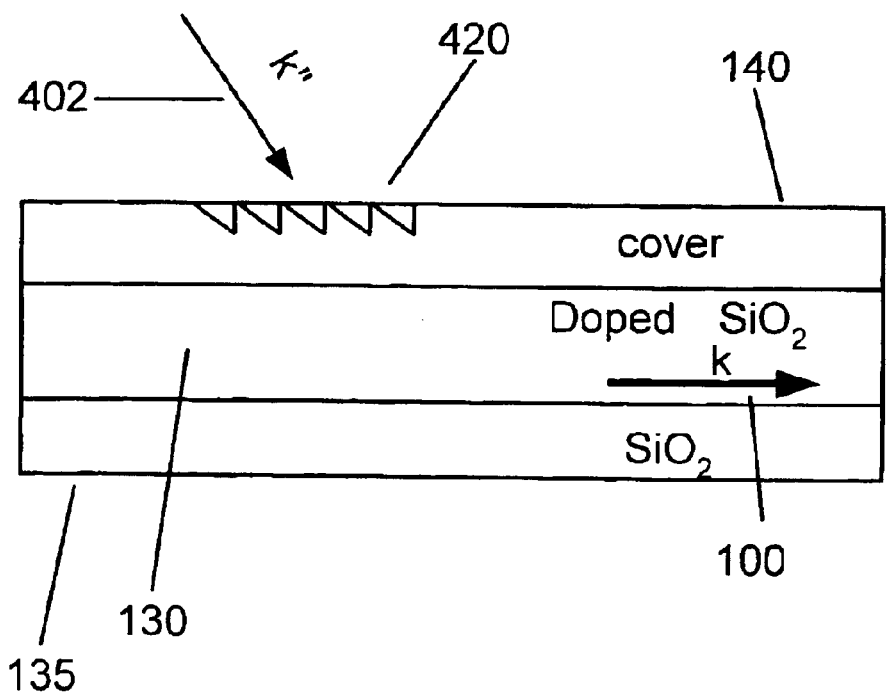

FIG. 4. schematically shows optical devices for operationally connecting processing units to the waveguide network. The term operationally connecting means to establish an optical connection between the electronics of the processor unit and the waveguide network. Electrical signals from each microprocessor are used to drive an array of lasers, preferably Vertical Cavity Surface Emitting Lasers (VCSEL'S), that can be fabricated on a common substrate with the processor units. VCSEL's are preferred because of their high density and thus the possibility to be integrated into CMOS technology. Light from the microprocessors driven lasers typically goes through various beam shaping optics, well known in the optical sciences. Following the beam shaping, the light has to enter the waveguide network. FIG. 4A shows an embodiment where this is accomplished with prism coupling optics. Light from the beam shaping optics 401 is directed k" to prism 410, which couples the light for guidance into layer 130 of the waveguide network. An array of rutile prisms 410 can be fabricated commonly with the laser array and beam shaping optics. These would then be used to prism-couple light into the waveguide that is part of the optical backplane. An alternate preferred embodiment of coupling light into the waveguide is to use grating coupling optics instead of prism coupling optics. Light from the beam shaping optics 402 is directed k" to grating 420, which couples the light for guidance into layer 130 of the waveguide network. This gratings coupling optics 420 can be etched directly into the waveguides.

Figure 5A:
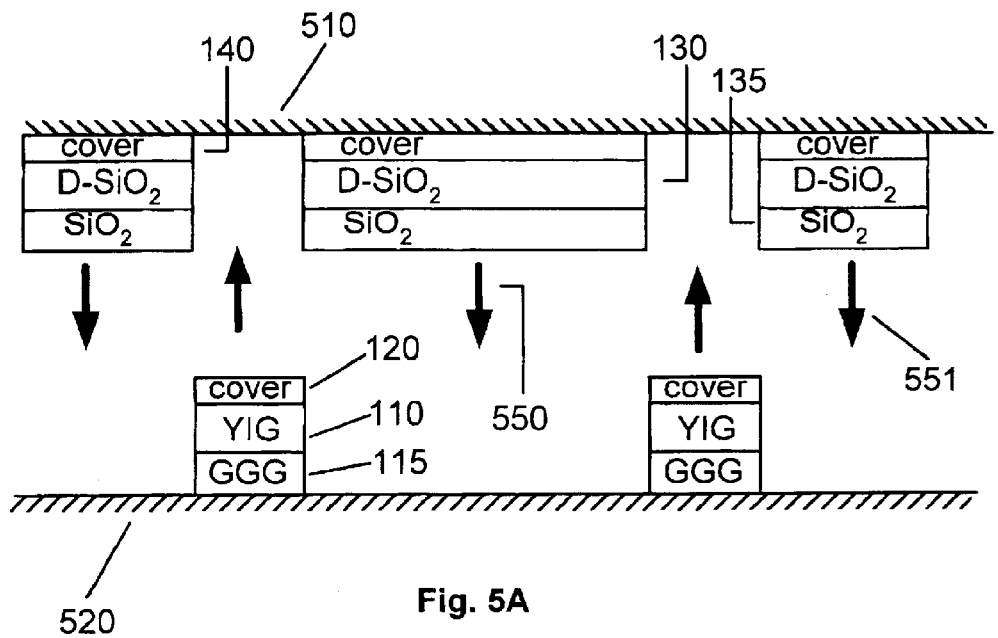
FIG. 5. Shows various embodiments for integrating a magneto optic rotator with a waveguide.

FIG. 5. shows various embodiments for integrating a magneto optic rotator with a waveguide. FIG. 5A shows fabrication of a seamlessly meshed coplanar waveguide configuration. The YIG waveguide structure 110 can be grown, for instance, by LPE, or epitaxial sputter deposition on GGG substrates 115. While the GGG itself rests on a substrate 520, which can be removed if needed upon completion of the whole structure. A cover layer 120, itself maybe made of GGG, can also be deposited, but it is not necessarily needed.

Once the YIG structures are grown they are patterned by etching, or by lithography into properly spaced approximately 3 mm sections that would mate 550 and 551 to the $SiO_2$ structures. The $SiO_2$, or possibly polymer, waveguide network itself is deposited or grown on a substrate 510, which can be removed if needed upon completion of the whole structure. The $SiO_2$ waveguide structure can be lithographically patterned to accommodate the sections of YIG waveguides. In this manner the network of optical waveguides, including routers, are seamlessly meshed together into a coplanar configuration.

Figure 5B:
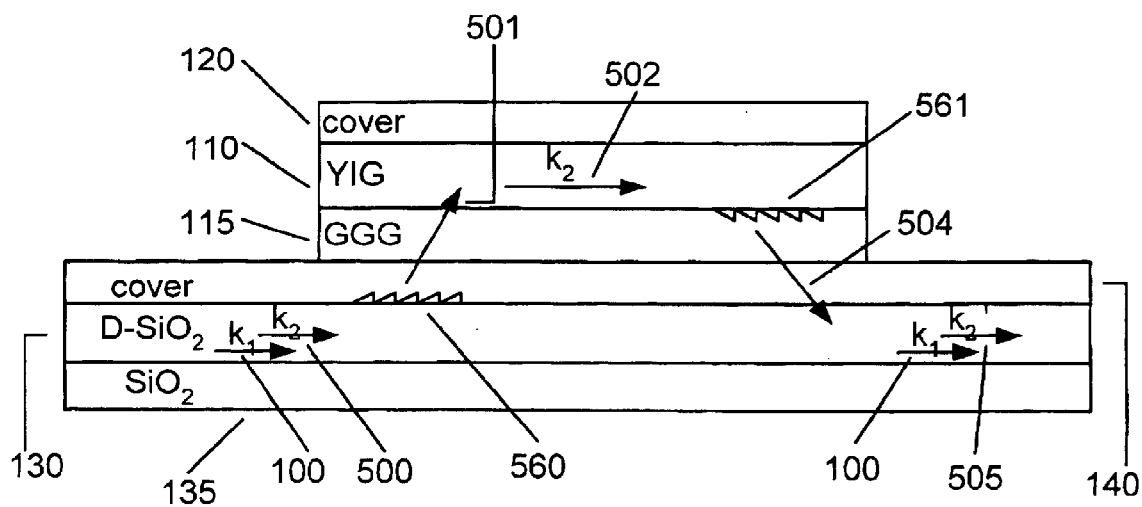

FIG. 5B shows and embodiment where the MOR waveguide is external to the network of optical waveguides, and where grating coupling is used to steer the light between the waveguides. This embodiment is preferred when the optical waveguides contain a number of wavelengths, making use of wavelength division multiplexing to increase bandwidth. The figure shows only two wavelengths, 100 and 500, but the embodiment can deal with many more. The aggregate number of external MOR sections increases proportionally with the number of the wavelengths. For instance, for two different wavelengths one needs two external MOR sections. Although FIG. 5B shows the operation of only a single external MOR, the operation of multiple ones is exactly the same. The etched grating 560 matches one of the light wavelengths 500, and this light is switched out 501 into the MOR. Here at the system's choice the polarization angle of light 501 is rotated, or not rotated, propagating now as light 502. After the rotating sections a grating etched into the MOR 561 steers light 502 toward 504 the waveguide network. Returning to the waveguide network and propagating as light 505, it has the same wavelength as earlier 500, except that its polarization angle might have been changed. In the meantime light 100 propagates uninterrupted, since its wavelength is not matched to grating 560. Routing of light 100 occurs at another section of the waveguide network, where another external MOR is coupled to the waveguide with a grating that matches the wavelength of light 100.

Figure 6:
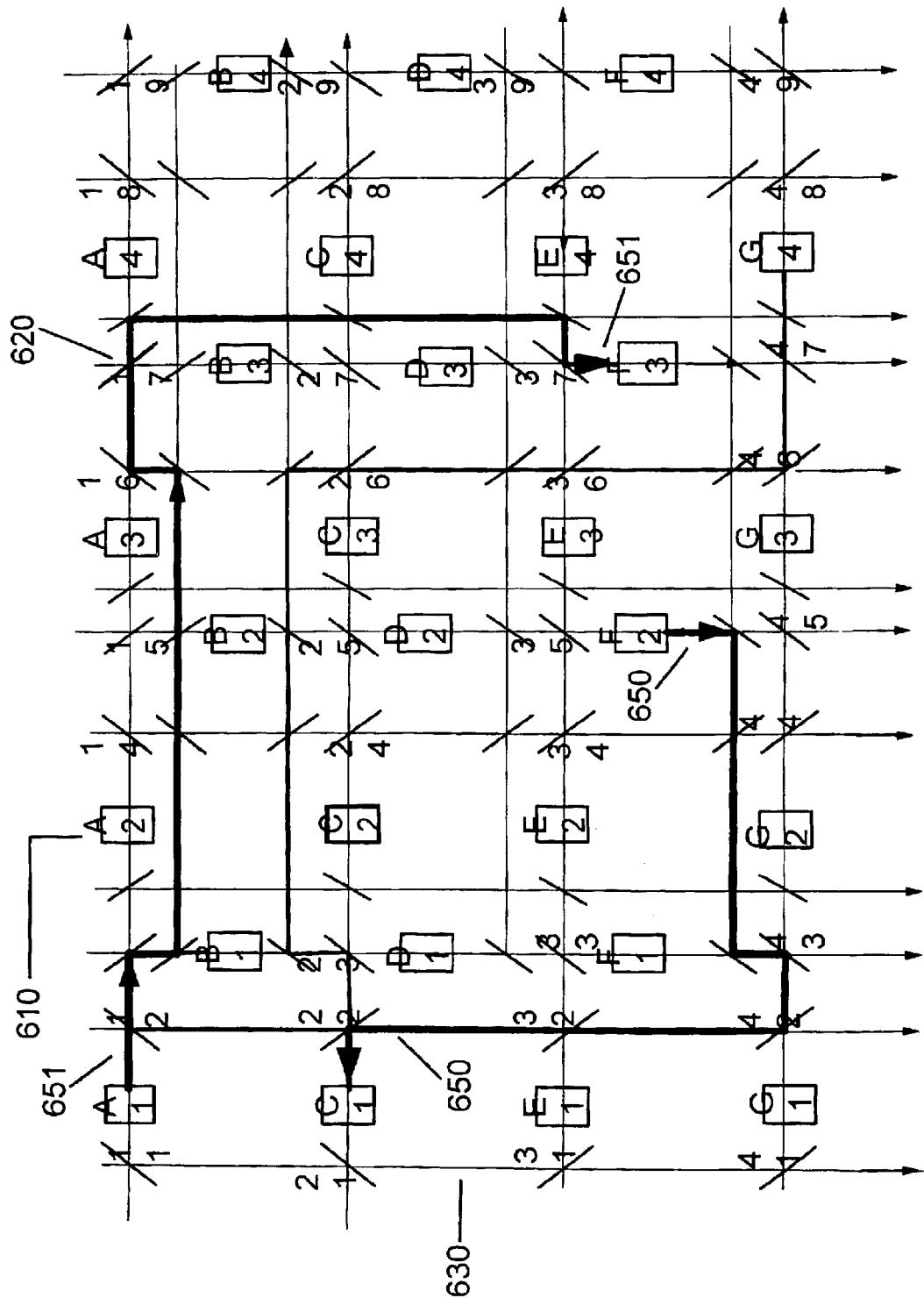
FIG. 6. Schematically shows part of an optical backplane interconnecting processing units of an electronic processor.

FIG. 6. schematically shows part of an optical backplane interconnecting processing units of an electronic processor. This backplane provides optical interconnections amongst processing units of the electronic processor, which comprises of all such processing units. Processing units 610, labeled from A1 to F4 are interconnected 630 with the waveguides of the backplane. At vertexes of the network reside the magneto optic routers 620, labeled from 11 to 49. The network can establish a connection path between any two processing units. FIG. 6 shows two such example paths. Path 651 guides optical signals from processing unit A1 to processing unit F3, while path 650 guides optical signals from processing unit F2 to processing unit C1. Such paths are formed upon the arising of a communication need by setting the state of the appropriate MOR routers. When the communication has occurred, the routers and waveguides of the former path are ready to be part of a new path. The method of directing such communication amongst said processing units should keep track at any given time of a state of said optical backplane, should accept requests for communication from one or more of the processing units, should identify available optical paths, should connect the processing units in need of communication, should set the conditions of the optical routers along the chosen path, and should direct the processing units in need of communication to execute the communication. The communication in the optical network can be point to point, or in a broadcasting mode, where one processing unit simultaneously transfers data to more than one other unit, or possibly to all of the other units. The backplane is efficient in area density. Counting a processing unit operationally connected to the network, a router, and a PBS as one element, one can roughly place as many as 100 elements on a 10 cm² surface.

Many modifications and variations of the present invention are possible in light of the above teachings, and could be apparent for those skilled in the art. The scope of the invention is defined by the appended claims.

We claim:

1. A router for a polarized light, comprising:
    an optical waveguide for guiding said polarized light;
    a magneto optic rotator (MOR) for controllably rotating a polarization angle of said polarized light, wherein said MOR comprises:
    (a) a first section, wherein in said first section a magnetic field is selectively switched between two modes, and wherein in said two modes said magnetic field has equal magnitudes and opposite directions, whereby in maid first section said polarization angle is rotated by a fixed magnitude and selectively in opposing directions;
    (b) a second section following said first section, wherein in said second section a permanent magnetization prevails; and
    a polarization beam splitter (PBS) seamlessly integrated into said optical waveguide for accepting said polarized light from said MOR, and routing said polarized light according to said polarization angle.

2. The router of claim 1, wherein in said first section said fixed magnitude of said polarization angle rotation is approximately 45°, whereby said polarization angle in said first section is selectively rotated approximately by either +45° or −45°, and in said second section said constant value of said polarization angle rotation is approximately +45°, whereby said polarization angle, upon said polarized light passing through said first section and said second section, is selectively rotated approximately by either +90° or by 0°.

3. The router of claim 1, wherein said first section and said second section of said MOR are integrated into said optical waveguide, each comprising a magneto-optically active layer guiding said polarized light.

4. The router of claim 3, wherein said first section and said second section further comprising at least one additional optical layer, said additional optical layer interfacing with said magneto-optically active layer, wherein said additional optical layer having a lower refractive index than said magneto-optically active layer.

5. The router of claim 3, wherein said magnetic field in said first section of said MOR is generated by a current flowing in a metallic strip, wherein said metallic strip substantially covering said first section.

6. The router of claim 4, wherein said magneto-optically active layer comprising of Yttrium iron Garnet (YIG), and said additional optical layer comprising Gadolinium Gallium Garnet (GGG).

7. A routing method for a polarized light in an optical waveguide comprising the steps of:
    controllably rotating a polarization angle of said polarized light in a magneto optic rotator (MOR), wherein said MOR being a segment of said optical waveguide, and said controllably rotating further comprises the steps of:
    (a) selectively switching a magnetic field between two modes in a first section of said MOR, wherein in said two modes said magnetic field has equal magnitudes and opposite directions, whereby in said first section said polarization angle is rotated by a fixed magnitude and selectively in opposing directions;
    (b) rotating said polarization angle by a constant value in a second section of said MOR, wherein said second section following said first section, and wherein in said second section a permanent magnetization prevails; and
    accepting said polarized light from said MOR and routing said polarized light along an optical path, in accordance with said polarization angle with a polarization beam splitter (PBS) which is seamlessly integrated into said optical waveguide.

8. An optical backplane for optical interconnections amongst processing units of an electronic processor, comprising:
    a network of optical waveguides, said optical waveguides guiding a polarized light;

routers for said polarized light at vertexes of said network of optical waveguides, each router comprising:
(a) a magneto optic rotator (MOR) for controllably rotating a polarization angle of said polarized light, wherein said MOR comprises;
(aa) a first section, wherein in said first section a magnetic field is selectively switched between two modes, and wherein in said two modes said magnetic field has equal magnitudes and opposite directions, whereby in said first section said polarization angle is rotated by fixed magnitude and selectively in opposing directions;
(bb) a second section following said first section, wherein in said second section a permanent magnetization prevails;
(b) a polarization beam splitter (PBS) for accepting said polarized light from said MOR, and routing said light according to said polarization angle, wherein said PBS is seamlessly integrated into said optical waveguides; and
optical devices for operationally connecting said processing units of said electronic processor to said network.

9. The optical backplane of claim 8, wherein said first section and said second section of said MOR, and said network of optical waveguides are being seamlessly meshed together into a coplanar configuration.

10. The optical backplane of claim 8, wherein said first section and said second section of said MOR are external to said network of optical waveguides, and wherein said first and second sections are grating coupled to said network of optical waveguides.

11. A method for providing an optical interconnection amongst processing units of an electronic processor using an optical backplane, comprising the steps of:
guiding a polarized light in a network of optical waveguides;
routing said polarized light through vertexes of said network of optical waveguides by controllably rotating a polarization angle of said polarized light using a magneto optic rotator (MOR), wherein said controllably rotating further comprises the steps of: (a) selectively switching a magnetic field between two modes in a first section of said MOR, wherein in said two modes said magnetic field has equal magnitudes and opposite directions, whereby in said first section said polarization angle is rotated by a fixed magnitude and selectively in opposing directions; (b) rotating said polarization angle by a constant value in a second section of said MOR, wherein said second section following said first section, and wherein in said second section permanent magnetization prevails; and accepting said polarized light from said MOR and routing said light along an optical path in accordance with said polarization angle by a polarization beam splitter (PBS) which is seamlessly integrated into said optical waveguides; and
operationally connecting said processing units of said electronic processor to said network of optical waveguides by optical devices.

12. The method for providing an optical interconnection of claim 11, further comprising the step of selecting said MOR to seamlessly mesh together with said optical waveguides into a coplanar configuration.

13. An optical backplane for optical interconnections amongst processing units of an electronic processor comprising:
a network of optical waveguides for guiding a polarized light of a plurality of wavelengths;
a plurality of magneto optic rotators (MOR) for controllably rotating a polarization angle of said polarized light in vertexes of said network of optical waveguides, wherein said plurality of MOR are grating connected to said network of optical waveguides, wherein each of said plurality of wavelengths is individually grating coupled to one MOR of said plurality of MOR, each MOR comprising:
(a), a first section, said first section comprising a magneto-optically active Yttrium Iron Garnet (YIG) layer guiding said polarized light, and a Gadolinium Gallium Garnet (GGG) layer interfacing with said YIG layer, wherein said GGG layer having a lower refractive index than said YIG layer, said first section further comprising a metallic strip, wherein said metallic strip substantially covering said first section, wherein a current flowing in said metallic strip generating a magnetic field in said first section, wherein said magnetic field being selectively switched between two modes, and wherein in said two modes said magnetic field has equal magnitudes and opposite directions, whereby in said first section said polarization angle is selectively rotated approximately by either +45° or −45°.
(b), a second section following said first section, wherein said second section comprising a second magneto-optically active YIG layer guiding said polarized light, and a second GGG layer interfacing with said second YIG layer, wherein said second GGG layer having a lower refractive index than said second YIG layer, and wherein in said second section a permanent magnetization prevails, whereby in said second section said polarization angle is rotated by approximately +45°, whereby said polarization angle, upon said polarized light passing through said first section and said second section, is selectively rotated approximately by either +90° or by 0°;
a plurality of polarization beam splitters (PBS) for accepting said polarized light from said plurality of MOR, and routing said light according to said polarization angle; and
optical devices for operationally connecting said processing units of said electronic processor to said network.

14. The optical backplane of claim 13, wherein said optical waveguides are planar waveguides.

15. The optical backplane of claim 13, wherein said optical waveguides are strip waveguides.

16. The optical backplane of claim 13, wherein said optical waveguides are cylindrical waveguides.

17. The optical backplane of claim 13, wherein said network of optical waveguides comprising a doped $SiO_2$ layer guiding said polarized light, and an undoped $SiO_2$ layer interfacing with said doped $SiO_2$ layer, wherein said undoped $SiO_2$ layer having a lower refractive index than said doped $SiO_2$ layer.

18. The optical backplane of claim 17, wherein said network of optical waveguides further comprising a third optical layer in a sandwich structure, wherein said doped $SiO_2$ layer being disposed between said undoped $SiO_2$ layer and said third optical layer, wherein said third optical layer having a lower refractive index than said doped $SiO_2$ layer.

19. The optical backplane of claim 13, wherein said PBS is seamlessly integrated into said optical waveguides.

20. The optical backplane of claim 19, wherein said PBS is a vertical polarization grating etched into said optical waveguides.

21. The optical backplane of claim 19, wherein said PBS is a Brewster angle beam splitter etched into said optical waveguides.

22. The optical backplane of claim 19, wherein said PBS is a birefringent prism built into said optical waveguides.

23. The optical backplane of claim 19, wherein said PBS is having asymmetric waveguide output arms, wherein each of said waveguide output arms is capable of propagating light only with one predetermined polarization angle.

24. The optical backplane of claim 13, wherein said optical devices for operationally connecting said processing units comprise a prism coupling optics.

25. The optical backplane of claim 13, wherein said optical devices for operationally connecting said processing units comprise a grating coupling optics.

26. A method for providing an optical interconnection amongst processing units of an electronic processor using an optical backplane, comprising the steps of:

guiding a polarized light of a plurality of wavelengths in an network of optical waveguides;

routing said polarized light through vertexes of said network of optical waveguides by controllably rotating a polarization angle of said polarized light using a plurality of magneto optic rotators (MOR) which are connected to said network of optical waveguides by gratings, and coupling each of said plurality of wavelengths by said gratings to a corresponding MOR of said plurality of MOR, and accepting said polarized light from said MOR and routing said light along an optical path by a polarization beam splitter (PBS), in accordance with said polarization angle, wherein said controllable rotation of said polarization angle in each of said MOR comprises the steps of:

(a) using a first section, said first section comprising a magneto-optically active Yttrium Iron Garnet (YIG) layer guiding said polarized light, and a Gadolinium Gallium Garnet (GGG) layer interfacing with said YIG layer, wherein said GGG layer having a lower refractive index than said YIG layer, and selectively switching a magnetic field between two modes in said first section, wherein in said two modes said magnetic field has equal magnitudes and opposite directions, wherein in said first section said polarization angle is rotated approximately by either +45° or by −45°, and creating and switching said magnetic field by switching a current in a metallic strip which is substantially covering said first section;

(b), using a second section following said first section, wherein said second section comprising a second magneto-optically active YIG layer guiding said polarized light, and a second GGG layer interfacing with said second YIG layer, wherein said second GGG layer having a lower refractive index than said second YIG layer, and rotating said polarization angle by approximately +45° by prevailing a permanent magnetization in said second section, wherein upon said polarized light passing through said first section and said second section it is selectively rotated approximately by either +90° or by 0°; and operationally connecting said processing unite of said electronic processor to said network of optical waveguides by using optical devices.

27. The method for providing an optical interconnection of claim 26, further comprising the step of selecting said PBS to seamlessly integrate into said optical waveguides.

\* \* \* \* \*